(12) United States Patent
Diestelhorst

(10) Patent No.: US 10,682,905 B2
(45) Date of Patent: Jun. 16, 2020

(54) FUEL TANK FOR A MOTOR VEHICLE

(71) Applicant: Volkswagen Aktiengesellschaft, Wolfsburg (DE)

(72) Inventor: Axel Diestelhorst, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 338 days.

(21) Appl. No.: 15/582,868

(22) Filed: May 1, 2017

(65) Prior Publication Data

US 2017/0232834 A1   Aug. 17, 2017

Related U.S. Application Data

(63) Continuation of application No. PCT/EP2015/071812, filed on Sep. 23, 2015.

(30) Foreign Application Priority Data

Oct. 30, 2014   (DE) .......................... 10 2014 222 142
Apr. 28, 2015   (DE) .......................... 10 2015 207 835

(51) Int. Cl.
*B60K 15/03*      (2006.01)
*B29C 49/04*      (2006.01)
(Continued)

(52) U.S. Cl.
CPC .... *B60K 15/03177* (2013.01); *B29C 48/0017* (2019.02); *B29C 49/04* (2013.01); *B29C 49/20* (2013.01); *B29C 2049/2013* (2013.01); *B29K 2101/12* (2013.01); *B29K 2105/258* (2013.01); *B29L 2031/7172* (2013.01); *B60K 2015/0344* (2013.01); *B60K 2015/0346* (2013.01);
(Continued)

(58) Field of Classification Search
CPC ...... B60K 15/03177; B60K 2015/0344; B60K 2015/0346; B60K 2015/03467; B60K 2015/03493; B29C 48/0017; B29C 49/04; B29C 49/20; B29C 2049/2013; B29K 2101/12; B29K 2105/258; B29L 2031/7172
USPC ................ 220/562, 563, 4.13, 4.14; 137/574
See application file for complete search history.

(56) References Cited

U.S. PATENT DOCUMENTS 6,138,859 A   10/2000  Aulph et al.
6,175,260 B1   1/2001  Hahner et al.
(Continued)

FOREIGN PATENT DOCUMENTS

DE   198 33 698 A1   2/2000
DE   101 07 075 A1   9/2001
(Continued)

*Primary Examiner* — Elizabeth J Volz
(74) *Attorney, Agent, or Firm* — Muncy, Geissler, Olds & Lowe, P.C.

(57) ABSTRACT

A fuel tank and a method for producing a fuel tank for a motor vehicle. The fuel tank is designed as a blow-molded hollow plastic member, into the interior of which a functional component support is introduced. The support, to which functional components, such as a fuel pump, a level indicator or valves can be secured, includes at least one supporting leg to be supported on an inner face of the hollow plastic member delimiting the interior thereof. The supporting leg of the functional component support is designed to include a connection point to which a functional component can be connected.

10 Claims, 5 Drawing Sheets

(51) Int. Cl.
  *B29C 48/00*   (2019.01)
  *B29C 49/20*   (2006.01)
  *B29K 101/12*   (2006.01)
  *B29K 105/00*   (2006.01)
  *B29L 31/00*   (2006.01)

(52) U.S. Cl.
  CPC ............... *B60K 2015/03467* (2013.01); *B60K 2015/03493* (2013.01)

(56) References Cited

U.S. PATENT DOCUMENTS

| | | | |
|---|---|---|---|
| 6,712,234 | B2 | 3/2004 | Boecker |
| 6,736,282 | B2 | 5/2004 | Krogull |
| 7,909,587 | B2 | 3/2011 | Hagist et al. |
| 8,951,461 | B2 | 2/2015 | Heim et al. |
| 2004/0129708 | A1 | 7/2004 | Borchert et al. |
| 2009/0162472 | A1 | 6/2009 | Aoki et al. |
| 2009/0230133 | A1* | 9/2009 | Takeuchi ............... B29C 49/20 220/562 |
| 2011/0139342 | A1 | 6/2011 | Jannot et al. |
| 2011/0139793 | A1* | 6/2011 | Park ................. B60K 15/03177 220/563 |
| 2011/0226777 | A1 | 9/2011 | Asahara et al. |
| 2012/0298212 | A1 | 11/2012 | McClure et al. |
| 2015/0217635 | A1* | 8/2015 | Nakane ................... B29C 49/20 220/562 |
| 2015/0343899 | A1 | 12/2015 | Furusawa |

FOREIGN PATENT DOCUMENTS

| | | |
|---|---|---|
| DE | 101 28 308 A1 | 1/2003 |
| DE | 102 60 953 A1 | 7/2004 |
| DE | 103 56 061 A1 | 7/2005 |
| DE | 10 2009 030 492 A | 1/2011 |
| EP | 2 328 739 B1 | 7/2012 |
| EP | 2 511 069 B1 | 2/2014 |
| EP | 2 730 445 A1 | 5/2014 |
| GB | 2 493 848 A | 2/2013 |
| JP | 2009-132296 A | 6/2009 |
| WO | WO 2012/139961 A1 | 10/2012 |
| WO | WO 2014/112236 A1 | 7/2014 |
| WO | WO 2014/122747 A1 | 8/2014 |

\* cited by examiner

FUEL TANK FOR A MOTOR VEHICLE

This nonprovisional application is a continuation of International Application No. PCT/EP2015/071812, which was filed on Sep. 23, 2015, and which claims priority to German Patent Application No. 10 2014 222 142.0, which was filed in Germany on Oct. 30, 2014, and German Patent Application No. 10 2015 207 835.3, which was filed in Germany on Apr. 28, 2015, and which are all herein incorporated by reference.

BACKGROUND OF THE INVENTION

Field of the Invention

The invention relates to a fuel tank for a motor vehicle and to a method for producing such a fuel tank.

Description of the Background Art

According to conventional practice, such fuel tanks can be produced from a thermoplastic resin, for example by extrusion blow molding or by welding injection-molded half-shells made of thermoplastic resin. In the interior of such a fuel tank, functional components of the fuel system can be accommodated, as a result of which the space requirement outside the fuel tank is reduced and, in addition, the number of required tank openings is reduced, which is advantageous with regard to emissions from the fuel tank.

DE 102 60 953 A1, which corresponds to US 2004/0129708, and which discloses a generic fuel tank which is designed as a blow-molded hollow plastic member, into the interior of which a functional component support is inserted. Various functional components, such as a fuel pump, a level indicator or valves, can be attached to the functional component support. In addition, the functional component support has supporting legs, by means of which the carrier is supported on opposite sides on the inside of the fuel tank.

In the production of the fuel tank, the functional component support is first fitted with the functional components by forming a pre-assembly unit, which is separate from the fuel tank. The assembled functional component support is then inserted into the interior of a tubular fuel tank preform made of thermoplastic resin. Subsequently, a blow molding process takes place, in which the preform is expanded to its final outer contour in a blow molding tool using blown air and application of heat. During the blow molding process, the functional component support is also welded or glued to the inside of the fuel tank in the region of its supporting legs. Accordingly, at least the supporting legs of the functional component support are made of a plastic material which is compatible with the plastic material of the fuel tank with regard to weldability.

The precisely positioned arrangement of the functional components in the interior of the fuel tank is of great importance in order to ensure the functional reliability of the fuel tank even in extreme driving situations, such as an extreme curve position or an extreme acceleration. The functional component support must therefore be rigidly connected to the plastic container by means of the supporting legs so as to ensure a torsion-proof, tilt-proof and non-slip positioning in the fuel tank.

As mentioned above, the functional component support is manufactured in common practice from a thermoplastic resin with a comparatively low material thickness. The functional component support is thus designed to be elastically compliant (i.e., with low inherent stiffness), so that overall a relatively compliant arrangement of the functional component support is achieved, which can be disadvantageous with regard to a secure positioning of the functional components.

SUMMARY OF THE INVENTION

It is therefore an object of the invention to provide a fuel tank and a method for producing such a fuel tank, in which a secure positioning in the interior of the fuel tank is ensured in a simple manner.

In an exemplary embodiment a functional component support is rigidly connected to the inner wall of the fuel tank via its supporting legs. The transition from the supporting leg of the functional component support into the fuel tank wall thus forms a node location which is dimensionally stable and through which forces are transferred. Therefore, the node location is designed with an increased component stiffness in comparison to adjacent, elastically compliant regions. By utilizing this fact, the supporting leg of the functional component support is formed according to the characterizing part of claim 1 with a connection point to which a functional component can be connected. The functional component is thus fastened directly to the supporting leg. The supporting leg of the functional component support, which defines the component-rigid node location, is thus also used in a double function for the correct positioning of the functional component.

The functional component support can be, for example, a baffle wall, which reduces the fuel surge movements and which extends transversely through the interior of the fuel tank and divides the latter into compartments. The baffle wall is supported with supporting legs on opposite sides on the inside of the fuel tank so that the otherwise resiliently flexible fuel tank wall is dimensionally stabilized.

The supporting leg can be a flat, plate-shaped wall section with a contact surface, which is in contact with the fuel tank interior, for example, in a welded connection. The contact surface can have a knob-shaped surface structure with which the heat capacity at the contact surface is reduced in order to improve weldability.

On a side of the wall section facing away from the contact surface, the connection point of the functional component can be provided. In this way, the connection point of the functional component is positioned directly on the supporting leg, which together with the inner wall of the fuel tank defines the above-specified component-rigid node location.

With a view to simple assembly, it is advantageous if the functional component is mountable at the connection point without tools. For this reason, the connection point can have at least one latching element which can be brought into latching engagement with a corresponding counter-contour on the functional component.

The baffle wall acting as a functional component support can be formed from a flat material with a thin wall thickness. For further stiffening, an assembly space with a stiffening effect can be formed in the baffle wall in which the connection point is positioned. The assembly space can be covered on the upper side by the supporting leg wall section which merges into a half-shell-shaped circumferential wall angled therefrom. The circumferential wall can partly surround the connection point. At the bottom, the above-mentioned assembly space can be limited by a mounting base. In a preferred technical implementation, the above-mentioned latching element can have a latching web, which is formed on the supporting leg wall section and projects into the assembly space. At the free end of the latching web, a latching lug can be formed which engages behind the counter-contour on the functional component.

The assembly space can be open to the outside via an access opening. During assembly, the functional component can be inserted into the assembly space through the access opening. The access opening may extend between the upper supporting leg wall region and the mounting base, and may be laterally bounded by the edges of the half-shell-shaped circumferential wall.

In the production of the fuel tank, the functional component support is initially fitted with the at least one functional component by forming a pre-assembly unit which is separate from the fuel tank. When the functional component support is fitted, in a first assembly step, the functional component can be inserted into the assembly space in an insertion direction through the access opening, and pre-positioned therein. In a second assembly step, the pre-positioned functional component can be connected in an assembly direction to the connection point of the supporting leg.

In order to simplify the assembly process, the assembly space can have an insertion section with a large access cross-section on its side that is spaced apart from the connection point. In this way, the insertion as well as the pre-positioning of the functional component in the assembly space is simplified. In addition, the insertion section of the assembly space can transition in the direction of the connection point, into a positioning section, which has a reduced cross-section as compared to the insertion section, while forming a positioning slope. In this way, in the second assembly step, the functional component, which is moved in the assembly direction, is automatically aligned with respect to the connection point in the supporting leg.

The assembled functional component support is then inserted into the interior of a fuel tank preform made of plastic material. In a subsequent blow molding operation, blown air is introduced into the preform, which is arranged in a blow molding tool, and the preform is expanded to its final outer contour under internal pressure and under application of heat. During the blow molding process, the welding of the supporting legs to the inner wall of the fuel tank is simultaneously carried out.

After the functional component support has been fitted with, for example, the operating ventilation and refueling valves, the blow molding process is carried out, in which the fitted functional component support is initially inserted into the interior of the tubular fuel tank preform made of a thermoplastic resin. This takes place in an insertion direction along a tube longitudinal axis of the tubular fuel tank preform. After the insertion, the fuel tank preform is expanded to its final component contour in a blow molding tool by means of blow air and under application of heat.

During the insertion of the functional component support into the tubular fuel tank preform, there is a risk that the functional component support will collide with the inner wall of the tubular fuel tank preform. This can possibly lead to damage to the thermoplastic resin or it can affect the correct positioning of the operating ventilation and refueling valves in the fuel tank.

The connection points formed on the functional component supports for the above-mentioned valves, as well as the supporting legs as viewed in the direction of insertion, can be arranged at a longitudinal distance from one another, and arranged one behind the other. In this way, the insertion cross-section of the functional component support can be reduced, whereby during the insertion process, disadvantageous collisions of the functional component support with the inner wall of the tubular plastic container preform can be avoided. In order to further reduce the insertion cross-section of the functional component support, the connection points and/or the supporting legs, as viewed in the insertion direction, can be arranged at least partially in alignment one behind the other.

For further stiffening of the finished plastic container, the functional component support can have strut arrangements spaced apart from each other in the direction of insertion. Each of the strut arrangements is supported across the supporting legs transversely to the direction of insertion on opposite fuel tank inner surfaces to form component-rigid node locations with the aid of which the fuel tank is improved in terms of dimensional stability.

The functional component support can, for example, be inserted into the fuel tank preform by means of a retaining mandrel (pin). A stable mounting of the functional component support on the retaining mandrel is of great importance with regard to process reliability. For this purpose, the functional component support can have at least one or more retaining mandrel passage openings, through which the retaining mandrel can be inserted up to a movement stop. The connection points for the operating ventilation and refueling valves can be positioned in the retaining mandrel, which is inserted in the functional component support, without or only with a small transverse offset.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
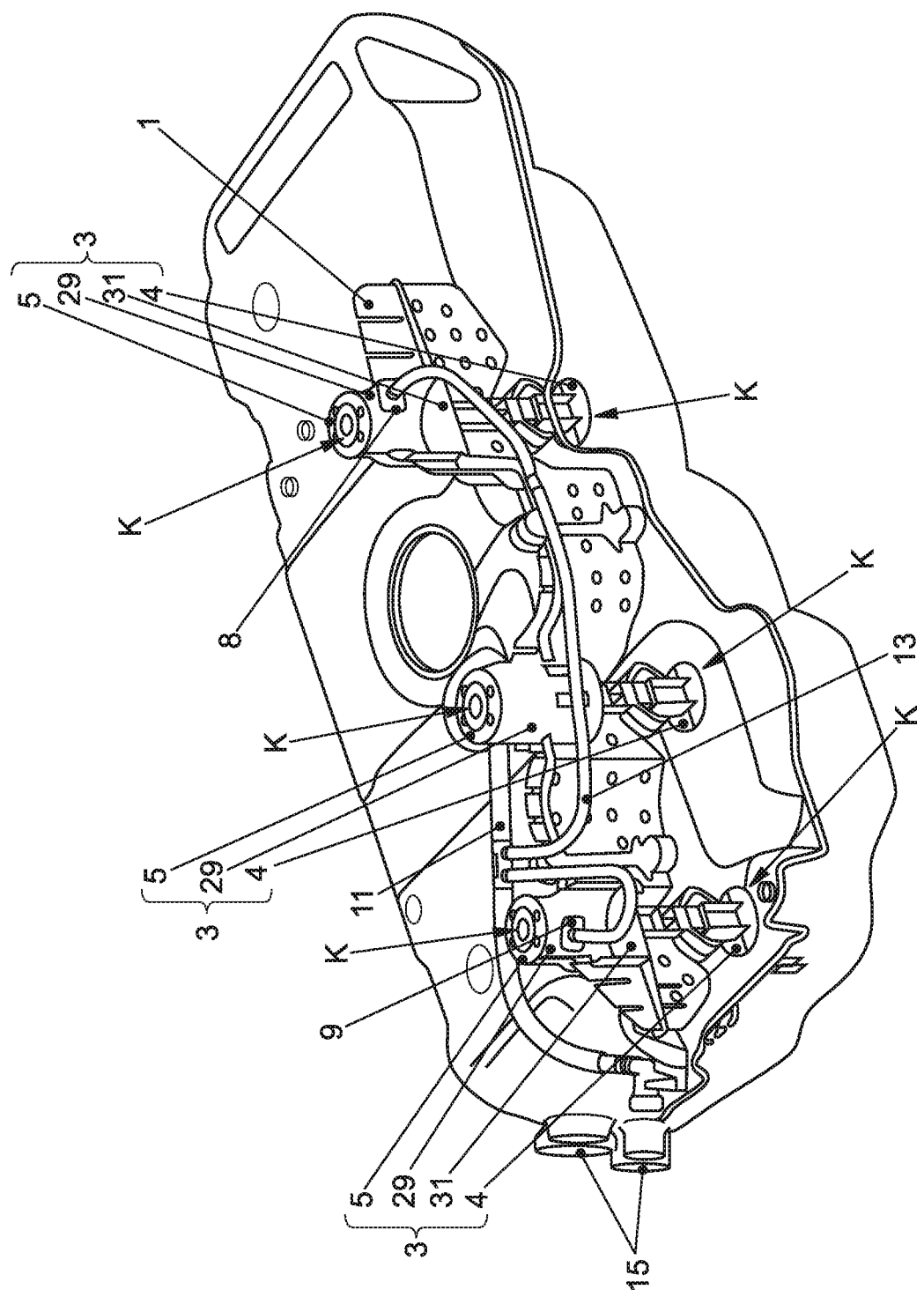
FIG. 1 is a perspective view of a plastic fuel tank, in the interior of which a baffle acting as a functional component support is arranged.

FIG. 1 is a perspective view of a fuel tank made from a thermoplastic resin, which is designed as a blow-molded plastic hollow member. In the interior of the fuel tank, an elongated baffle wall 1 is arranged, which divides the interior of the tank. The baffle wall 1 is also manufactured from a thermoplastic resin, for example in an injection-molding process. As can be seen from FIG. 1, a total of three mutually spaced vertical, columnar strut arrangements 3, which are supported in a vertical direction between the upper and lower fuel tank inner sides, are integrated in the baffle wall 1. For this purpose, each of the strut arrangements 3 of the baffle wall 1 has lower supporting legs 4 and upper supporting legs 5, which are supported on the respective fuel tank interior side, under the formation of node locations K. The node locations K are designed to be rigid to provide the fuel tank and the baffle wall 1 arranged therein with sufficient dimensional stability.

In FIG. 1, each of the upper supporting legs 5 of the strut arrangements 3 is formed with an additional connection point 7, in which functional components, such as a fuel pump or venting valves 8, 9, are connected. The venting valves 8, 9 are connected to a vent line 11, which can be guided outwards via a tank connector 15.

Figure 3:
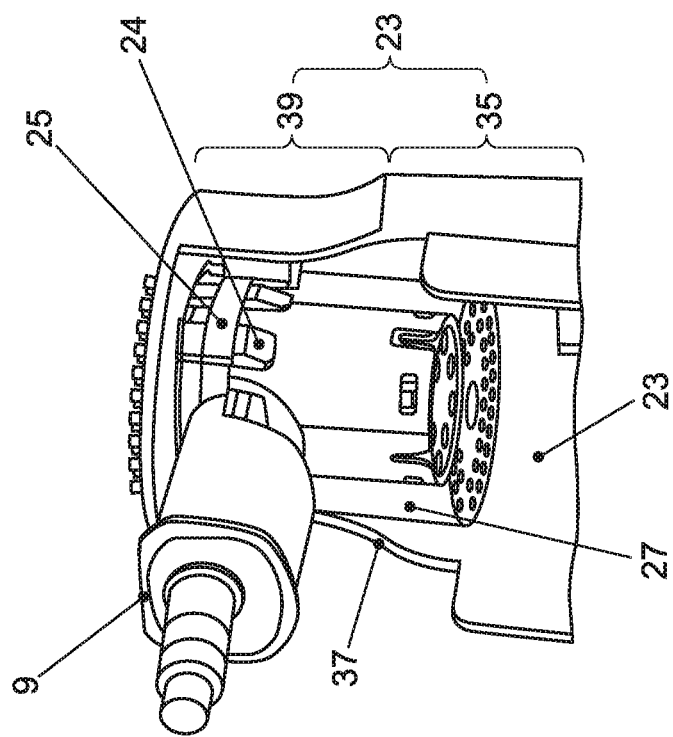
FIG. 3 illustrates the supporting leg of the baffle with a venting valve mounted thereon.
Figure 2:
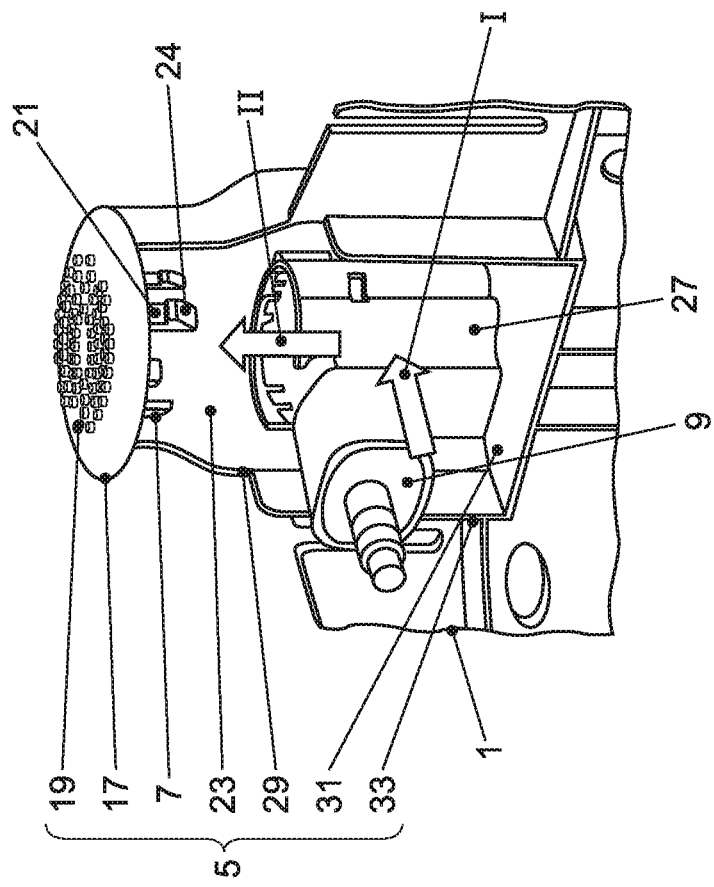
FIG. 2 is a perspective detailed view of an upper supporting leg of the baffle with an as yet still disassembled venting valve.

FIGS. 2 and 3 show the construction of one of the upper supporting legs 5. Accordingly, the supporting leg 5 has a plate-shaped wall section 17, on the upper side of which a knob-like structured contact surface 19 is formed. In the assembly position, the supporting leg wall section 17 is welded at its contact surface 19 to the fuel tank interior. In FIGS. 2 and 3, the connection point 7 has latching elements, the latching webs 21 of which are formed on the underside of the supporting leg wall section 17, facing away from the contact surface 19.

The latching webs 21 of the connection point 7 project vertically downwards into an assembly space 23. At their free lower ends, the latching webs 21 each have a latching lug 24, which, in the assembly position (FIG. 3), engage behind a corresponding counter-contour 25 on the housing 27 of the venting valve 9.

In FIGS. 2 and 3, the above-mentioned assembly space 23 is covered on the upper side by the supporting leg wall section 17, which merges into an angled, half-shell circumferential wall 29, which is arranged vertically and surrounds the connection point 7.

At the bottom, the assembly space 23 is bounded by a mounting base 31. Between the two vertically extending edges of the half-shell-shaped circumferential wall 29, an access opening 33 is defined, which extends in the vertical direction from the mounting base 31 to the lower side of the supporting leg wall section 17.

In the production of the fuel tank, firstly, the baffle wall 1 acting as a functional component support is fitted with the functional components 8, 9, under formation of a preassembly unit, which is separate from the fuel tank. The fitted baffle wall 1 is then inserted into the interior of a tubular fuel tank preform made of plastic. Subsequently, a blowing operation is carried out in which the preform is expanded into the final tank outer contour and, at the same time, the upper and lower supporting legs 4, 5 of the baffle wall are also welded at their contact surfaces 19 to the material of the plastic tank wall.

The assembly process is illustrated in FIGS. 2 and 3, in which the venting valve 9 is connected to the connection point 7 of the upper supporting leg 5. Accordingly, in a first assembly step, the venting valve 9 is inserted into the assembly space 23 through the access opening 33 in an insertion direction I (FIG. 2), and is pre-positioned there on the mounting base 31. Subsequently, in a second assembly step, the already pre-positioned venting valve 9 is displaced vertically upwards in an assembly direction II and locked with the connection point 7, as shown in FIG. 3. As a result of the latching process, a clicking sound is produced which confirms, as an acoustic feedback signal, a perfect connection of the venting valve 9 to the supporting leg 5. According to FIG. 3, the venting valve 9 is fastened in the locked state at a distance from the mounting base 31, on the underside of the supporting leg wall section 17.

For ease of assembly, the assembly space 23 has, on its side facing away from the connection point 7, an insertion section 35 with a large access cross-section, which allows for a simple pre-positioning of the venting valve 9 in the assembly space 23. The insertion section 35 of the assembly space 23 merges into an upper positioning section 39, in the upward direction to the connection point 7, to form a positioning slope 31, which has a reduced cross-section as compared to the insertion section 35. Due to the cross-section tapering, a precisely positioned alignment is made in the second assembly step (i.e., when the venting valve 9 is displaced onto the latching elements of the connection point 7) in the assembly direction II upwards.

The upper supporting legs 5 of the strut arrangements 3 shown in FIG. 1 are essentially identical to the supporting leg 5 shown in detail in FIGS. 2 and 3, but, if appropriate, are conformed to the respective functional component to be integrated therein.

Figure 6:
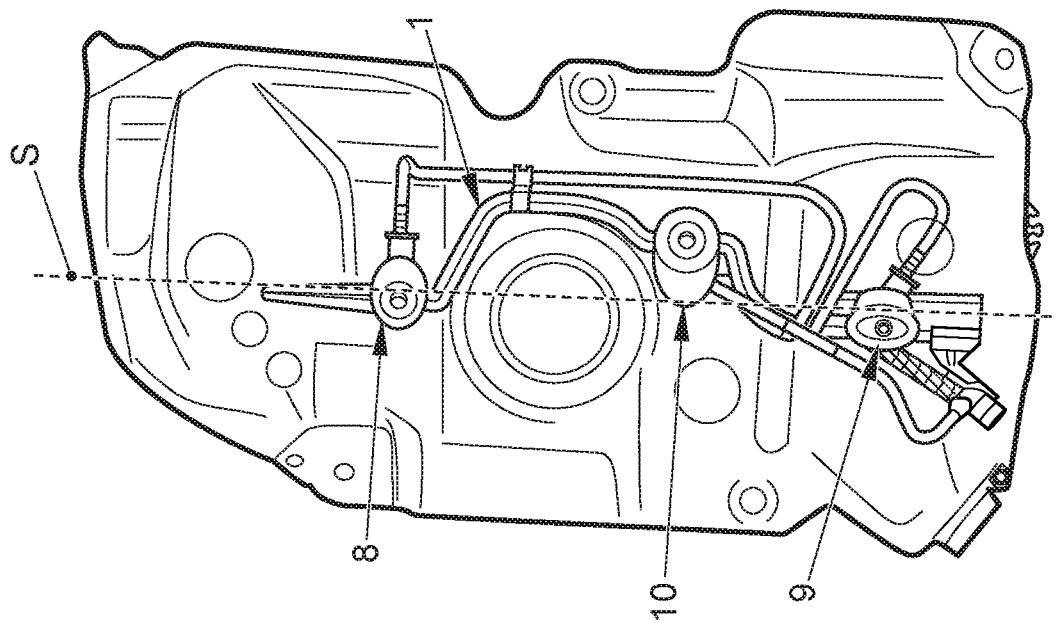

Below, FIGS. 4 to 8 describe the basic process steps for the production of the fuel tank shown in FIG. 1: according to FIG. 4, initially, a tubular fuel tank preform 41 made of a thermoplastic resin is provided, the inner wall of which defines a free cross-section $q_i$. The preassembled functional component support 1 is inserted (FIG. 5) into the interior of the tubular fuel tank preform 41 in an insertion direction E along a longitudinal axis S. In FIG. 5, the fuel tank preform 41 with the functional component support 1 inserted therein is located between two mold halves of a blow molding tool 43. This is closed for carrying out a blow molding operation. Blown air is then introduced into the preform 41, as a result of which the preform 41 is expanded under application of internal pressure and heat to its final component contour (FIG. 6).

Figure 4:
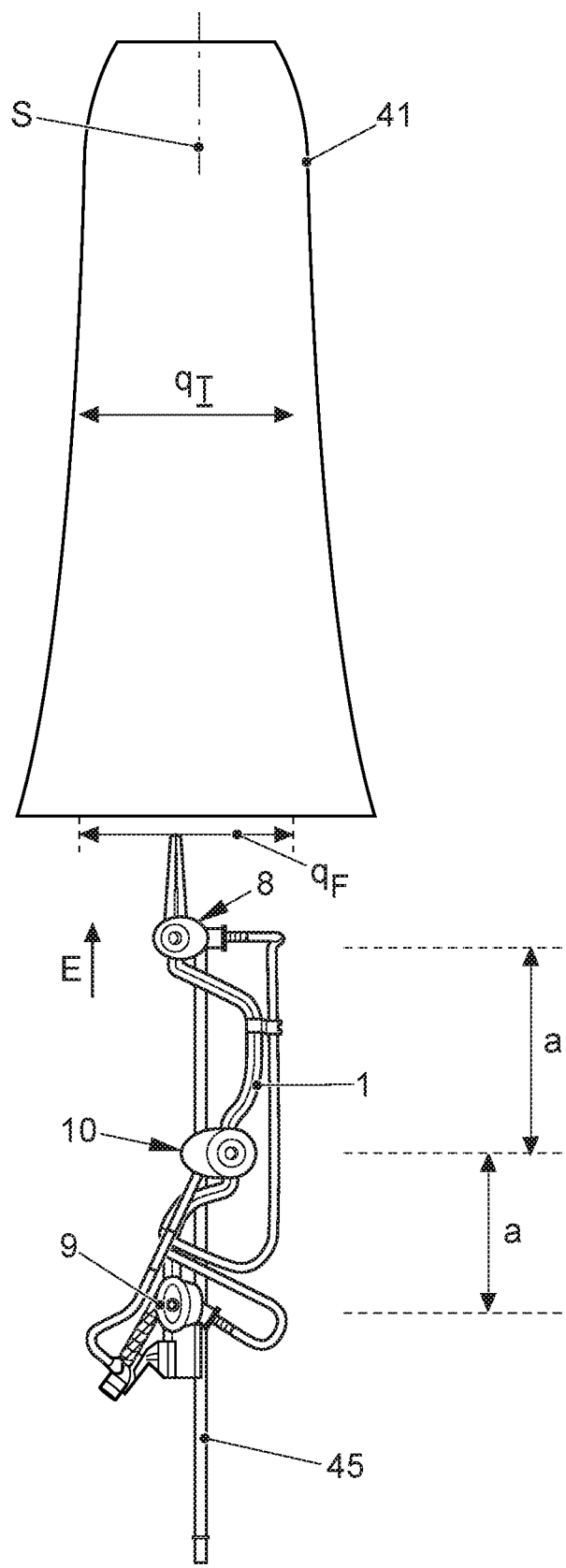
FIGS. 4 to 8 are respective views, each showing the process steps for producing the fuel tank shown in FIG. 1.
Figure 5:
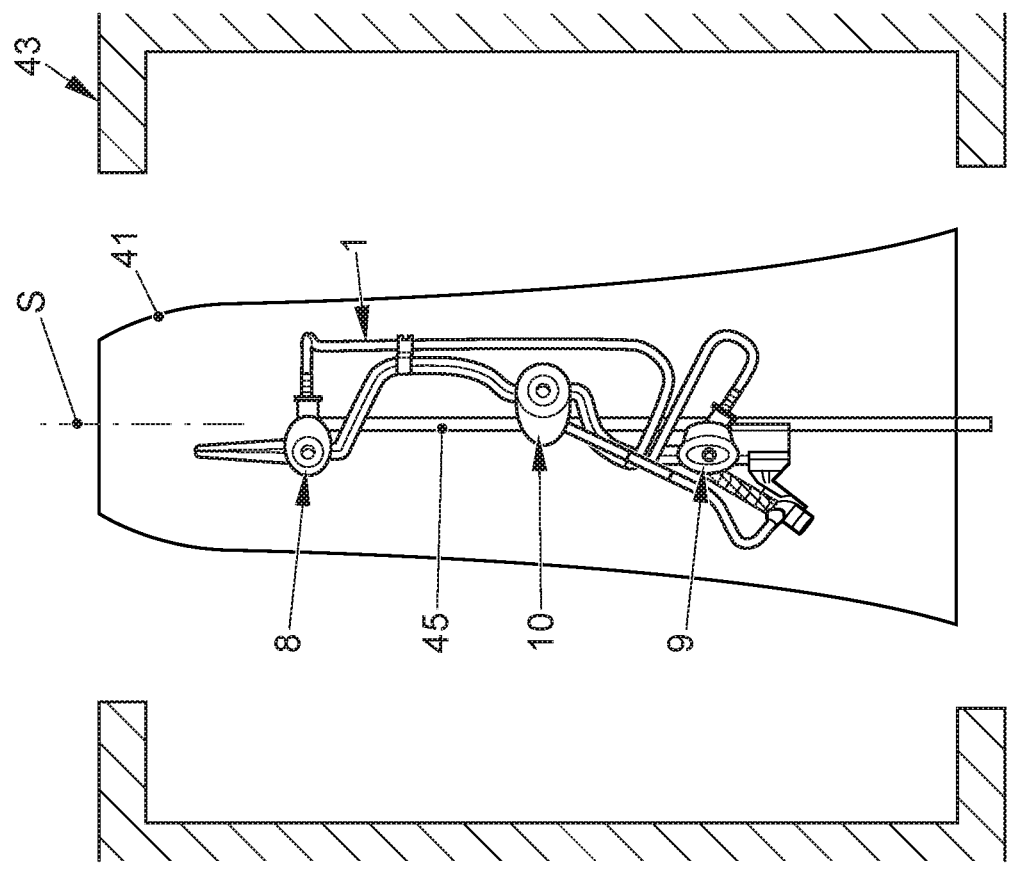

As can be seen in FIG. 4, the operating ventilation and refueling valves 8, 9, 10 as well as the supporting legs 4, 5 are arranged one behind the other at longitudinal intervals a, as viewed in the direction of insertion E. In addition, the two operating ventilation valves 8, 9 are arranged one after the other, as viewed in the direction of insertion E, while the middle refueling valve 10 is offset only laterally outwards by a small transverse displacement. Overall, an insertion cross-section q, which is substantially smaller than the interior cross-section $q_i$ provided by the tubular fuel tank preform 41, is thus obtained. As a result, a process-reliable insertion movement of the functional component support 1 is achieved in a simple manner without collision with the preform inner wall.

Figure 8:
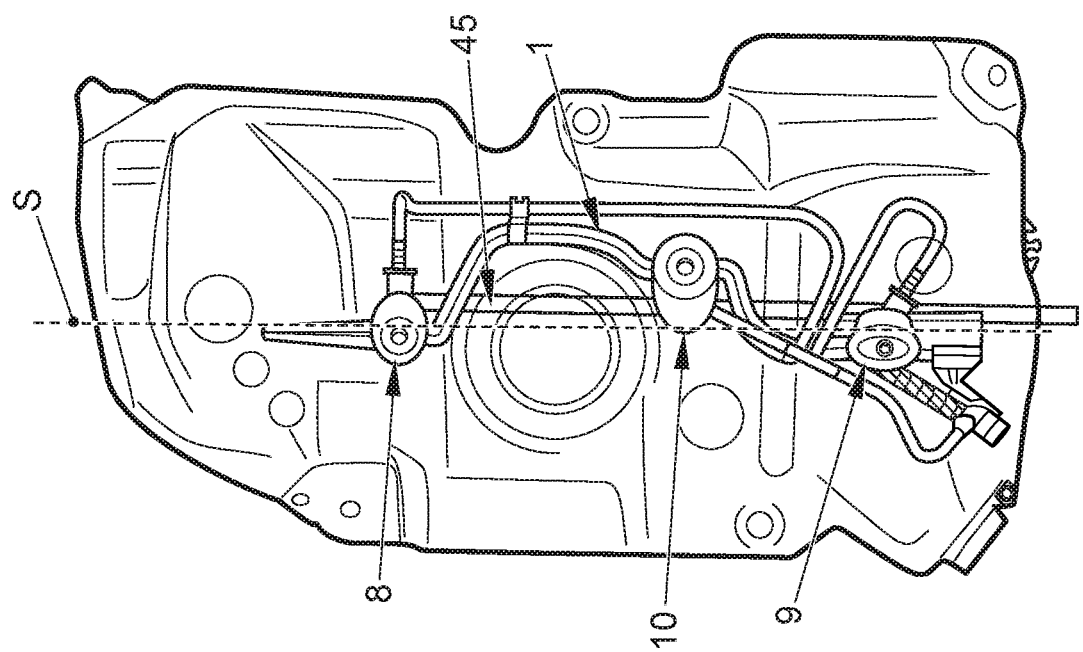
Figure 7:
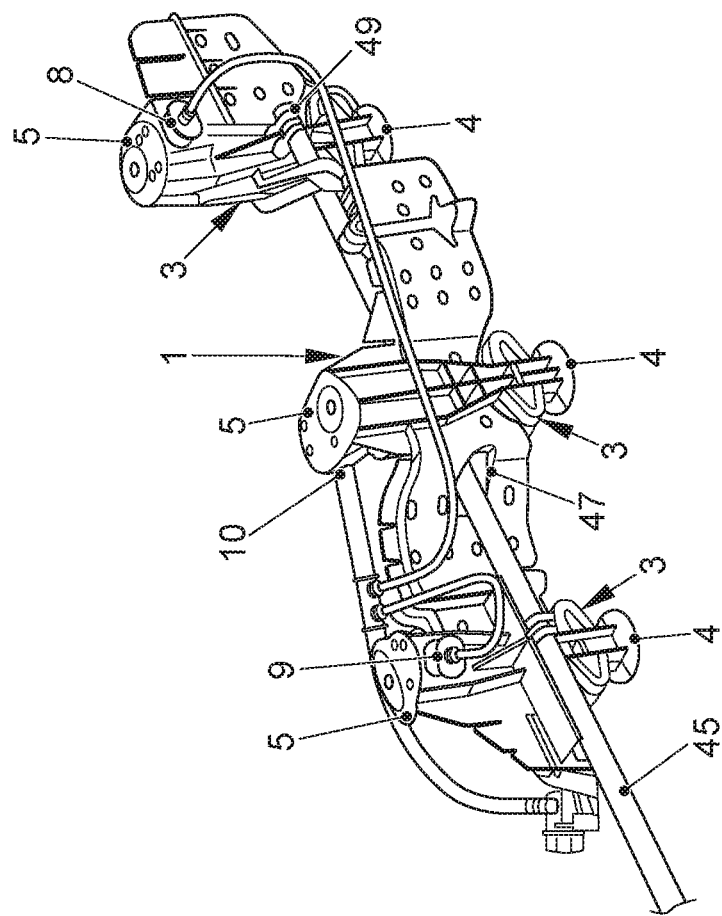

The insertion operation is performed according to FIG. 4 or 7 by means of a retaining mandrel 45. As can be seen in FIG. 7, the rod-shaped retaining mandrel 45 is inserted through passage openings 47 of the functional component support 1 up to a movement stop 49, which is located upstream in the insertion direction E. As shown in FIG. 8, the operating ventilation and refueling valves 8, 9, 10 are positioned on the functional component support 1, without or with only a small transverse offset to the retaining mandrel 45, in order to further reduce the insertion cross-section $q_F$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel tank for a motor vehicle, which is designed as a blow-molded plastic hollow member, the fuel tank comprising:

a functional component support arranged in an interior of the fuel tank, the functional component support having at least one functional component fastened thereto; and at least one supporting leg of the functional component support for providing support on opposing inner faces that bound the interior of the fuel tank, the at least one supporting leg of the functional component support being configured with a connection point to which the at least one functional component is fastened, wherein the at least one supporting leg has a wall section with a contact surface, the contact surface being in direct contact with one of the inner faces of the fuel tank via a welded connection, and wherein the connection point to which the at least one functional component is fastened is arranged on a surface of the wall section that opposes the contact surface, and wherein the connection point to which the at least one functional component is fastened is arranged in an assembly space of the at least one supporting leg, wherein the assembly space is covered by the wall section, wherein the wall section merges into a half-shell-shaped circumferential wall that is angled therefrom and surrounds the connection point and wherein the assembly space is bounded on a bottom by a mounting base.

2. The fuel tank according to claim 1, wherein the functional component support is a baffle wall which divides the interior of the fuel tank.

3. The fuel tank according to claim 1, wherein the connection point to which the at least one functional component is fastened has at least one latching element which is brought into latching engagement with a corresponding counter-contour on the at least one functional component.

4. The fuel tank according to claim 1, wherein the assembly space has an access opening that is defined by the wall section, the mounting base and boundaries of the half-shell-shaped circumferential wall, such that the at least one functional component is insertable through the access opening during assembly.

5. The fuel tank according to claim 1, wherein the assembly space has an upper positioning section and a lower insertion section, the lower insertion section having a larger cross-section than the upper positioning section and the connection point being positioned within the upper positioning section, and wherein, in a direction of the connection point, the lower insertion section of the assembly space, having the larger cross-section, merges into the upper positioning section thus forming a positioning slope.

6. The fuel tank according to claim 1, wherein the at least one functional component is a ventilation valve or a refueling valve, and wherein the functional component support has at least two of the at least one supporting leg and at least two of the at least one functional component fastened thereto, respectively, such that at least two supporting legs and at least two functional components are provided, the at least two supporting legs being spaced apart from one another.

7. The fuel tank according to claim 6, wherein the connection point of each of the at least two supporting legs are at least partly aligned one behind the other.

8. The fuel tank according to claim 6, wherein each of the at least two supporting legs is comprised of an upper leg portion and a lower leg portion, the upper leg portion being configured with the connection point, wherein the upper leg portion and the lower leg portion are respectively supported on the opposing inner faces of the fuel tank.

9. The fuel tank according to claim 6, wherein the functional component support comprises at least one retaining mandrel passage opening through which a retaining mandrel is insertable.

10. The fuel tank according to claim 1, wherein the at least one functional component is a fuel pump, a level indicator, or a valve.

* * * * *